United States Patent [19]

Takahashi

[11] Patent Number: 5,432,424
[45] Date of Patent: Jul. 11, 1995

[54] MOTOR CONTROL DEVICE MOTOR CONTROL DEVICE INCLUDING A GATE ELEMENT AND CURRENT CONTROLLER THAT CONTROLS MOTOR CURRENT ACCORDING TO THE GATE ELEMENT

[75] Inventor: Masayoshi Takahashi, Osaka, Japan

[73] Assignee: Mita Industrial Co., Ltd., Japan

[21] Appl. No.: 149,784

[22] Filed: Nov. 10, 1993

[30] Foreign Application Priority Data

Nov. 30, 1992 [JP] Japan .................................. 4-321016

[51] Int. Cl.[6] .............................................. H02P 8/00
[52] U.S. Cl. ..................................... 318/696; 318/432
[58] Field of Search .......... 318/696, 685, 432, 807–811, 318/767, 768, 770, 798–803, 636, 607; 388/812, 814, 815, 820, 823, 832

[56] References Cited

U.S. PATENT DOCUMENTS

| | | | |
|---|---|---|---|
| 4,051,418 | 9/1977 | O'Berto et al. | 318/759 |
| 4,227,138 | 10/1980 | Espelage et al. | 318/802 |
| 4,336,484 | 6/1982 | Marinko | 318/696 |
| 4,757,246 | 7/1988 | Komuro | 318/696 |
| 5,057,760 | 10/1991 | Dadpey et al. | 318/807 |
| 5,194,796 | 3/1993 | Domeki et al. | 318/696 |
| 5,335,307 | 8/1994 | Summer | 388/814 |

Primary Examiner—Jonathan Wysocki
Assistant Examiner—Brian Sircus
Attorney, Agent, or Firm—Beveridge, DeGrandi, Weilacher & Young

[57] ABSTRACT

A motor control device capable of obtaining necessary and sufficient torque produced by a motor irrespective of the rotation speed of the motor and capable of preventing overcurrent from being applied to the motor. Pulses having a predetermined pulse width are generated in the period inversely proportional to the number of revolutions of the motor. A current control signal is made effective in a time period during which the pulses are generated, while being made ineffective to use a predetermined reference signal instead in the remaining time period. The current control signal corresponds to current to be supplied to the motor so as to obtain the necessary torque. The predetermined reference signal corresponds to current less than the current corresponding to the current control signal. The ratio of a time period during which the current control signal is made effective is increased at the time of rotation at high speed, while the ratio of a time period during which the reference signal is used is increased at the time of rotation at low speed. Therefore, sufficient current to obtain the necessary torque is supplied to the motor at the time of rotation at high speed. On the other hand, the overcurrent can be prevented from being applied to the motor at the time of rotation at low speed.

6 Claims, 5 Drawing Sheets

MOTOR CONTROL DEVICE MOTOR CONTROL DEVICE INCLUDING A GATE ELEMENT AND CURRENT CONTROLLER THAT CONTROLS MOTOR CURRENT ACCORDING TO THE GATE ELEMENT

BACKGROUND OF THE INVENTION

1. Field of the Invention

The present invention relates to a motor control device suitably used for, for example, controlling a stepping motor for applying a driving force to a scanning system for scanning a document in a copying machine.

2. Description of the Related Art

A copying machine conforming to an electrophotographic process so adapted as to illuminate and scan a document and introduce light reflected from the document in the process of the scanning into a photoreceptor to form an electrostatic latent image corresponding to the document on the surface of the photoreceptor has been conventionally used. The electrostatic latent image on the surface of the photoreceptor is developed into a toner image. This toner image is transferred and fixed to copy paper, thereby to achieve copying of the document.

The illumination and scanning of the document is achieved by moving a moving frame supporting a light source and a reflecting mirror from one end to the other end of the document. A driving force from a motor is exerted on the moving frame through a suitable clutch or the like. A stepping motor capable of accurately controlling the rotation is generally used as this motor.

The moving speed of the moving frame is not constant. Specifically, the moving speed of the moving frame differs depending on, for example, the time of copying at equal magnification when the document is copied without changing its original size, the time of enlarged copying when the document is copied in an enlarged manner, the time of reduced copying when the document is copied in a reduced manner, and the time of a return operation when the moving frame which reached the terminal position for movement is returned to the home position which is the initial position. For example, when a photoreceptor in the shape of a right circular cylinder is used, the photoreceptor is driven to rotate at constant speed around its axis, while the moving speed of the moving frame is changed, thereby to make it possible to achieve enlarged copying or reduced copying. Therefore, at the time of enlarged copying, the moving frame is moved at lower speed than that at the time of copying at equal magnification depending on the magnification for enlargement. On the other hand, at the time of reduced copying, the moving frame is moved at higher speed than that at the time of copying at equal magnification depending on the magnification for reduction. Furthermore, at the time of the return operation, the moving frame is moved at high speed so as to prepare for the subsequent copying operation.

The change in the moving speed of the moving frame is achieved by changing the rotation speed of the stepping motor. Specifically, the stepping motor is controlled by a control circuit including a microcomputer or the like. The control circuit changes the pulse period for controlling the stepping motor depending on operations such as the copying at equal magnification, the enlarged copying, the reduced copying and the return operation. This pulse period is changed depending on the magnification at the time of enlargement or reduction. The stepping motor is stopped in a waiting time period immediately before any one of the operations is started.

When the moving frame is driven by the stepping motor, however, torque produced by the stepping motor becomes rather deficient when the stepping motor is rotated at high speed, resulting in the possibility that the moving frame cannot be sufficiently driven. In addition, when the stepping motor is rotated at low speed or is stopped, current supplied to the stepping motor becomes excessive, resulting in the possibility that the stepping motor abnormally generates heat or is damaged.

In order to avoid such programs, chopper constant current control is carried out so that current to be supplied to the stepping motor is held constant irrespective of the rotation speed of the stepping motor. However, experience has shown that a sufficient improvement is not achieved merely by keeping the current to be supplied to the stepping motor constant, so that the torque, the supplied current or the like becomes excessive or deficient.

Conventionally, a chopper constant current control level for determining the current to be supplied to the stepping motor is variably set depending on the rotation speed of the stepping motor at the operation times such as the time of copying at equal magnification, the time of enlarged copying, the time of reduced copying, the return time and the waiting time.

More specifically, the chopper constant current control level at each of the operation times is written in a RAM (Random Access Memory) which is backed up by a battery cell. A control circuit for controlling the stepping motor reads out the chopper constant current control level from the RAM at the operation time, converts the data into an analog signal and supplies the analog signal to a chopper constant current control circuit. Consequently, the chopper constant current control level conforming to the rotation speed of the stepping motor is set, so that necessary torque is obtained at the operation time, and the supplied current cannot be excessive.

The chopper constant current control level is written in the RAM in order to make the change of the level easy so that adjustment and maintenance can be easily performed in each copying machine.

However, the rotation speed of the stepping motor must be varied depending on the magnification at the time of enlarged copying or the time of reduced copying. Even if a constant chopper constant current control level is set with respect to magnification in the whole range for the enlarged copying or the reduced copying, therefore, it is impossible to sufficiently control the stepping motor in the whole range of magnification. For example, the torque becomes excessive or deficient. In addition, even when necessary torque can be obtained over the whole range of magnification, there are possibilities that the stepping motor abnormally generates heat and the stepping motor produces noise in a wide range of magnification.

In order to solve the problems, it is considered that the chopper constant current control level is finely set for each magnification and is stored in the RAM. In this case, however, there occur new problems that a lot of data must be stored in the RAM, and work for making data to be stored becomes very complicated.

Furthermore, at the time of acceleration when the speed of the moving frame is raised or the time of deceleration when the speed of the moving frame is lowered, the rotation speed of the stepping motor is gently changed so as to prevent the step-out of the stepping motor. If a constant chopper constant current control level is so set that necessary torque can be obtained over the whole time period during which the acceleration or the deceleration is achieved, torque is oversupplied to the moving frame in the respective time periods such as a time period immediately after the start of the acceleration and a time period immediately before the termination of the deceleration. Therefore, the speed of the moving frame cannot be gently changed, so that noise due to the vibration of the moving frame is produced.

Additionally, data in the RAM storing the chopper constant current control level is liable to be changed due to electrical noise or the like. In this case, an abnormal chopper constant current control level is set, so that a driving circuit for driving the stepping motor is liable to be destroyed due to overcurrent at the stop time or the time of rotation at low speed.

SUMMARY OF THE INVENTION

An object of the present invention is to solve the above described technical problems and to provide a motor control circuit capable of producing necessary and sufficient torque by a motor irrespective of the rotation speed, as well as capable of preventing overcurrent from being supplied to the motor.

In the present invention, pulses having a predetermined pulse width are generated in the period inversely proportional to the number of revolutions of a motor. A current control signal is made effective in a time period during which the pulses are generated, while being made ineffective to use a predetermined reference signal instead in the remaining time period. The current control signal corresponds to current to be supplied to the motor so as to obtain necessary torque. The predetermined reference signal corresponds to current less than the current corresponding to the current control signal.

Consequently, the ratio of a time period during which the current control signal is made effective is increased at the time of rotation at high speed, while the ratio of a time period during which the reference signal is used is increased at the time of rotation at low speed. Therefore, sufficient current is supplied to the motor at the time of rotation at high speed, thereby to make it possible to produce necessary torque from the motor. On the other hand, the supply of the current to the motor is limited at the time of rotation at low speed, thereby to make it possible to prevent overcurrent from being applied to the motor.

In such a manner, it is possible to obtain necessary and sufficient torque irrespective of the rotation speed of the motor, and it is possible to prevent the overcurrent from being supplied to the motor. In addition, current to be applied to the motor need not be predetermined for each different speed of rotation, so that no complicated work for previously making a lot of data is required.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 (a) to 4 (h) are timing charts showing operations at the time of rotation at low speed; and FIGS. 5 (a) to 5 (h) are timing charts showing operations at the time of rotation at high speed.

DESCRIPTION OF PREFERRED EMBODIMENTS

Figure 1:
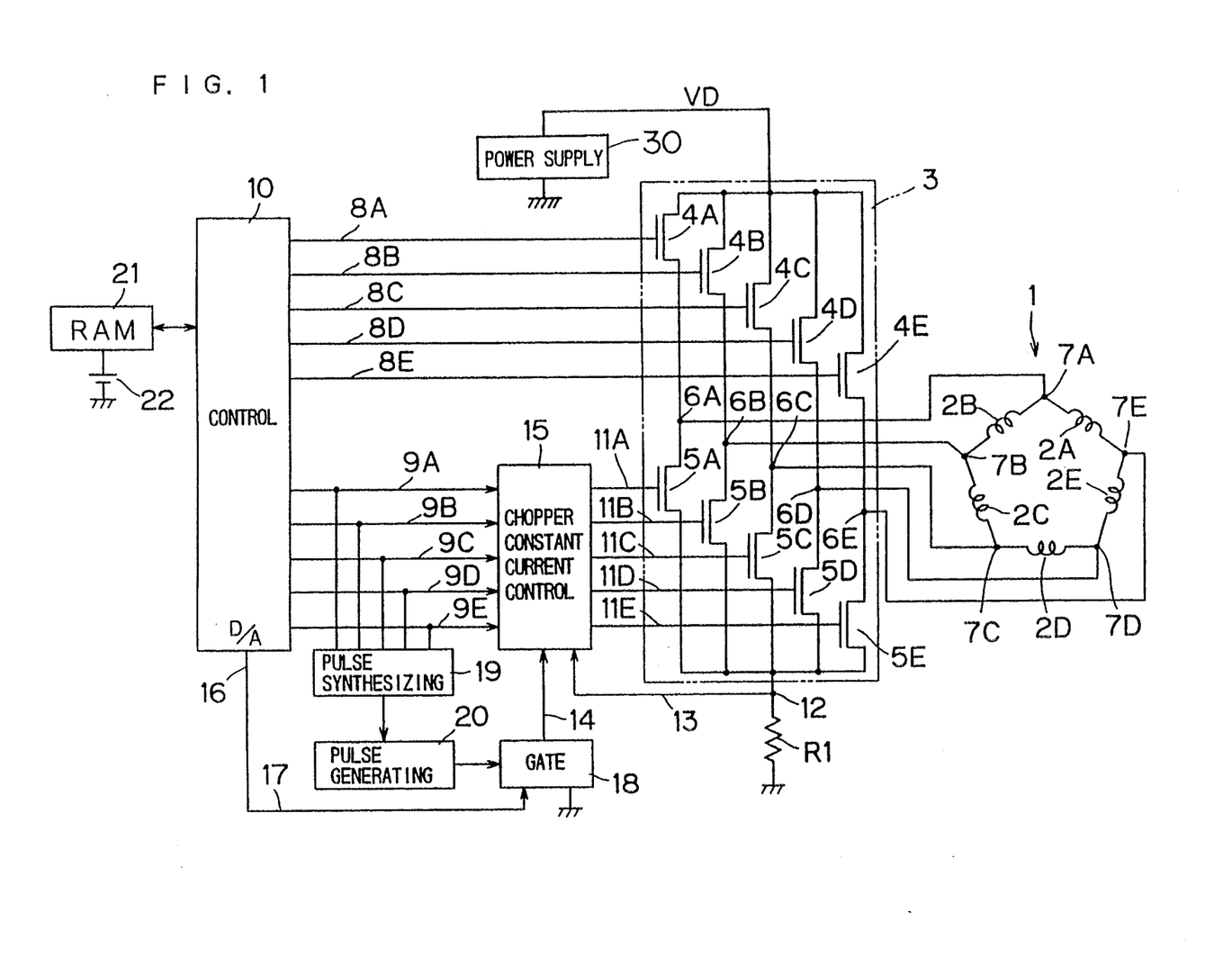
FIG. 1 is a block diagram showing the construction of a motor control device according to one embodiment of the present invention.

FIG. 1 is a block diagram showing the construction of a motor control device according to one embodiment of the present invention. The motor control device is applied to a copying machine comprising an optical system (corresponding to a scanning system) for illuminating and scanning a document. Specifically, the motor control device is used for controlling the supply of current to a stepping motor 1 for driving a moving frame provided for the optical system. In the copying machine to which the motor control device is applied, a photoreceptor in the shape of, for example, a right circular cylinder is rotated at predetermined angular velocity around its axis, and reflected light from the document is introduced into the surface of the photoreceptor. Consequently, an electrostatic latent image corresponding to an image of the document is formed on the surface of the photoreceptor. The electrostatic latent image is developed into a toner image by a developing device. The toner image is transferred and fixed to copy paper, thereby to achieve copying.

The stepping motor 1 is a five-phase motor which has an annular connection of motor windings 2A, 2B, 2C, 2D and 2E. Current is supplied to the stepping motor 1 through a motor driving circuit 3 from a power supply 30. In the present embodiment, the stepping motor 1 is driven by four-phase excitation.

The motor driving circuit 3 is a parallel connection of a series circuit of transistors 4A and 5A, a series circuit of transistors 4B and 5B, a series circuit of transistors 4C and 5C, a series circuit of transistors 4D and 5D, and a series circuit of transistors 4E and 5E. Nodes 6A, 6B, 6C, 6D and 6E between pairs of transistors each constituting the series circuit are respectively connected to nodes 7A, 7B, 7C, 7D and 7E between the motor windings 2A, 2B, 2C, 2D and 2E constituting the stepping motor 1.

Furthermore, a common power supply voltage VD (for example, 24V) from the power supply 30 is supplied to respective one ends of the series circuits each constituted by the pairs of transistors, and a common ground potential is applied to the respective other ends through a current detecting resistor R1.

Pulse-shaped control signals are respectively applied, through lines 8A, 8B, 8C, 8D and 8E, from a control circuit 10 including a microcomputer or the like to the transistors 4A, 4B, 4C, 4D and 4E to which the power supply voltage VD is applied. In addition, control signals from a chopper constant current control circuit 15 are respectively applied, through lines 11A, 11B, 11C, 11D and 11E, to the transistors 5A, 5B, 5C, 5D and 5E connected to the ground potential. The chopper constant current control circuit 15 subjects pulse-shaped control signals outputted to lines 9A, 9B, 9C, 9D and 9E from the control circuit 10 to pulse width modulation, to generate the above described control signals to be respectively applied to the transistors 5A, 5B, 5C, 5D and 5E. Each of the control signals applied to the transistors is a signal for rendering the transistor conductive or non-conductive.

The chopper constant current control circuit 15 functions as current control means. A potential appearing at a node 12 between the motor driving circuit 3 and a current detecting resistor R1 is applied to the chopper constant current control circuit 15 through a line 13. The current supplied from the power supply 30 is applied to the stepping motor 1 from the motor driving circuit 3 and is returned to the motor driving circuit 3 again and then, flows through the current detecting resistor R1. Therefore, a drop in voltage corresponding to the current supplied to the stepping motor 1 occurs in the current detecting resistor R1. Consequently, the potential at the node 12 becomes a value corresponding to the current flowing in the stepping motor 1. The chopper constant current control circuit 15 subjects the control signals from the control circuit 10 to pulse width modulation on the basis of this potential so that current corresponding to a chopper constant current control level serving as a current control signal inputted from a line 14 is supplied to the stepping motor 1.

More specifically, the chopper constant current control circuit 15 comprises, for example, a triangular wave generating circuit for generating a triangular wave having a predetermined frequency sufficiently higher than those of the control signals from the lines 9A to 9E, a comparing circuit for comparing the triangular wave with a predetermined threshold value, and a threshold value setting circuit for setting the above described threshold value in the comparing circuit. The threshold value setting circuit variably sets the threshold value on the basis of the signals from the lines 13 and 14, so that the pulse width of a pulse signal outputted from the comparing circuit is changed. The signals from the lines 9A to 9E are subjected to pulse width modulation on the basis of the output of the comparing circuit, thereby to achieve chopper constant current control.

The chopper constant current control level is outputted as a voltage signal from a digital/analog (hereinafter referred to as "D/A") output port 16 of the control circuit 10. The voltage signal is inputted to the chopper constant current control circuit 15 through a line 17 and a gate circuit 18. Specifically, the control circuit 10 functions as control signal generating means. The chopper constant current control level from the line 17 and the ground potential serving as a predetermined reference signal are applied to the gate circuit 18, either one of which is inputted to the chopper constant current control circuit 15 through the line 14. In other words, the gate circuit 18 has the function of making the chopper constant current control level outputted from the control circuit 10 effective or ineffective.

The signals outputted to the lines 9A, 9B, 9C, 9D and 9E from the control circuit 10 are also applied to the chopper constant current control circuit 15, and are also applied to a pulse synthesizing section 19. When the pulse-shaped control signal is outputted to any one of the lines 9A, 9B, 9C, 9D and 9E, the pulse synthesizing section 19 detects the rise of the control signal to output a predetermined trigger signal.

The trigger signal is applied to a pulse generating section 20. The pulse generating section 20 generates pulses having a predetermined pulse width every time the trigger signal is applied from the pulse synthesizing section 19. This pulse signal is inputted as a selecting signal to the gate circuit 18. The gate circuit 18 outputs the chopper constant current control level from the line 17 in a time period during which the pulse signal is applied from the pulse generating section 20, while outputting the ground potential to make the chopper constant current control level ineffective in a time period during which the pulse signal is not applied.

A RAM (Random Access Memory) 21 storing a plurality of types of chopper constant current control levels is connected to the control circuit 10. A backup battery cell 22 is connected to the RAM 21 so that the stored contents are held even if the power supply of the copying machine is shut off.

The chopper constant current control level which differs depending on, for example, the time of copying at equal magnification, the time of enlarged copying, the time of reduced copying and the return time is stored in the RAM 21. At the time of enlarged copying, the rotation speed of the above described photoreceptor is previously kept constant, and the moving frame holding a light source or the like is displaced at lower speed than that at the time of copying at equal magnification. In addition, at the time of reduced copying, the rotation speed of the photoreceptor is kept constant, and the above described moving frame is displaced at higher speed than that at the time of copying at equal magnification. Furthermore, at the time of the return operation, the moving frame is moved at high speed to the home position from the terminal position for scanning. Consequently, the rotation speed of the stepping motor 1 must be varied for each operation. If the chopper constant current control level is kept constant for all the operations, therefore, torque produced by the stepping motor 1 becomes excessive or deficient. Therefore, a plurality of types of chopper constant current control levels corresponding to the respective operations are stored in the RAM 21 so that the stepping motor 1 can produce necessary torque at the time of each of the respective operations, so that the chopper constant current control level is variably set for each operation.

In the present embodiment, however, the chopper constant current control level is not set for each magnification for enlarged copying and reduced copying. Specifically, predetermined chopper constant current control levels are respectively set irrespective of the magnification at the time of enlarged copying and the time of reduced copying.

Figure 2:
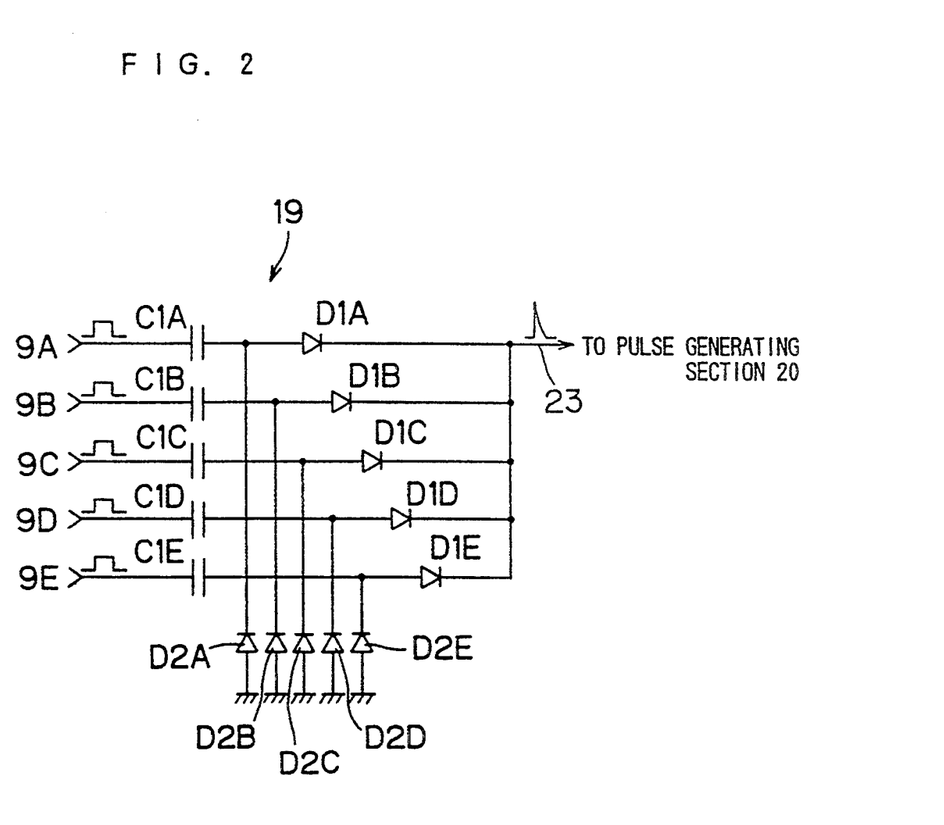
FIG. 2 is an electrical circuit diagram showing an example of the construction of a pulse synthesizing section.

FIG. 2 is an electrical circuit diagram showing an example of the construction of the pulse synthesizing section 19. The pulse-shaped control signals outputted to the lines 9A, 9B, 9C, 9D and 9E are applied to respective one ends of capacitors C1A, C1B, C1C, C1D and C1E. Diodes D1A, D1B, D1C, D1D and D1E are connected to the respective other ends of the capacitors C1A, C1B, C1C, C1D and C1E, and the diodes are together connected to a line 23. A signal appearing on the line 23 is applied to the pulse generating section 20. Respective lines between the capacitors C1A, C1B, C1C, C1D and C1E and the diodes D1A, D1B, D1C, D1D and D1E are clamped at the ground potential by diodes D2A, D2B, D2C, D2D and D2E.

By this construction, if the pulse signal is outputted to any one of the lines 9A, 9B, 9C, 9D and 9E, a trigger signal having a differential waveform corresponding to a rise portion of the pulse is outputted to the line 23.

Figure 3:
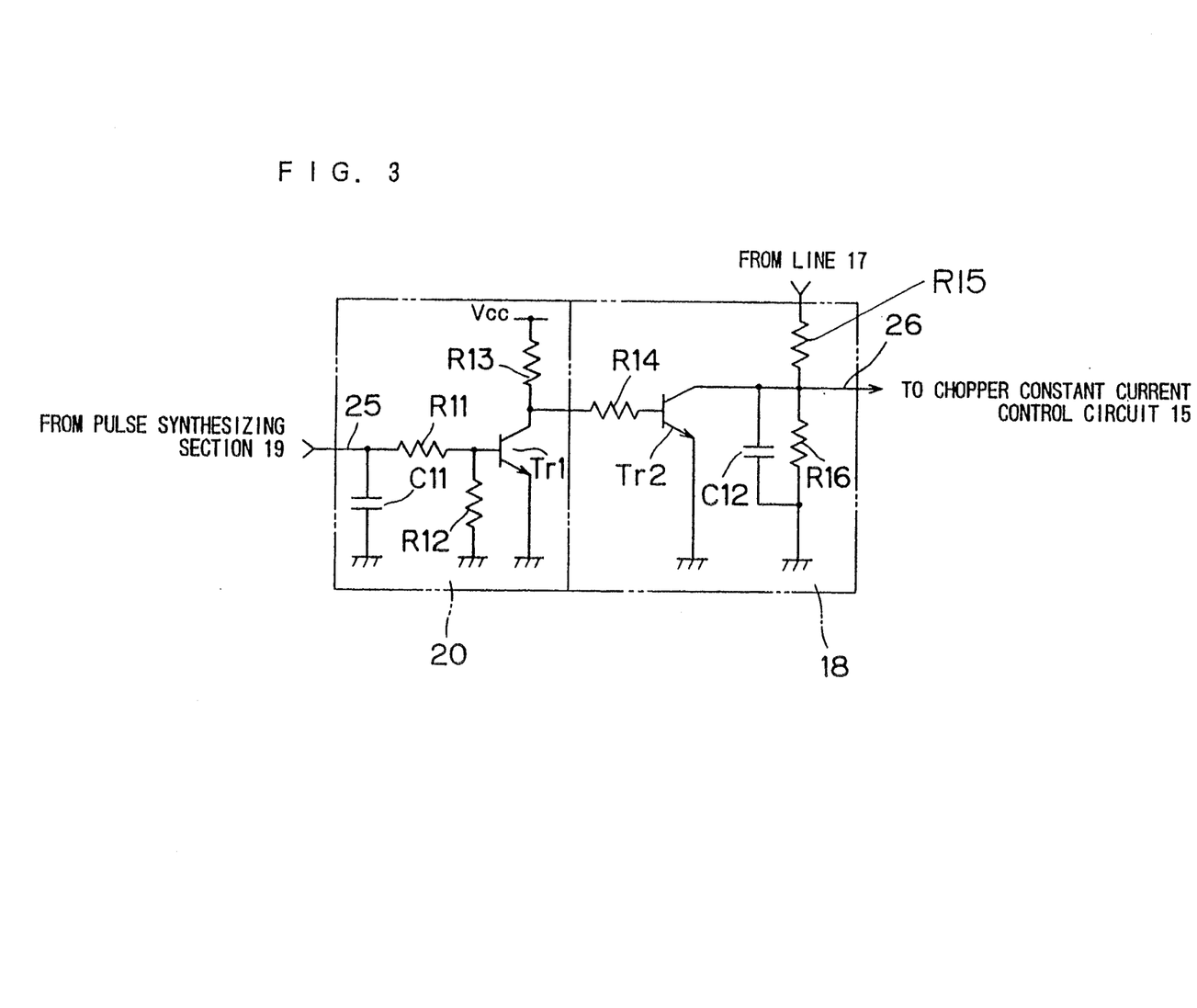
FIG. 3 is an electrical circuit diagram showing an example of the construction of a pulse generating section.

FIG. 3 is an electrical circuit diagram showing an example of the construction of the pulse generating section 20 and the gate circuit 18. The trigger signal from the pulse synthesizing section 19 is inputted to the base of an NPN transistor Tr1 through a resistor R11 from a line 25. A ground potential is applied to the base of the NPN transistor Tr1 through a resistor R12. In addition, a power supply voltage Vcc (for example, 5V) is applied to the collector of the NPN transistor Tr1 through a resistor R13. Furthermore, the ground potential is applied to the emitter of the NPN transistor Tr1. Additionally, the line 25 is connected to the ground potential through a capacitor C11.

By this construction, if the capacitor C11 is charged by the trigger signal applied from the pulse synthesizing section 19, charges stored in the capacitor C11 are supplied to the base of the NPN transistor Tr1 through the resistor R11. Consequently, the NPN transistor Tr1 is rendered conductive only in a predetermined time period determined by the capacitance value of the capacitor C11 and the resistance value of the resistor R11. As a result, a pulse signal which attains a low level only in a predetermined time period from the time when the trigger signal is applied and then, changes to a high level, is outputted to the collector of the NPN transistor Tr1.

This pulse signal is applied to an NPN transistor Tr2 in the gate circuit 18 through a resistor R14. A ground potential is applied to the emitter of the NPN transistor Tr2. A potential appearing on the collector of the NPN transistor Tr2 is applied to the chopper constant current control circuit 15 from a line 26. A chopper constant current control level outputted to the line 17 from the control circuit 10 is applied to the line 26 through a resistor R15. In addition, the line 26 is connected to the ground potential through a resistor R16 and a capacitor C12.

In this construction, if a high-level signal is applied to the NPN transistor Tr2 from the pulse generating section 20, the ground potential appears on the line 26. On the other hand, if a low-level signal is applied to the NPN transistor Tr2, potentials obtained by dividing the chopper constant current control level outputted to the line 17 by the resistors R15 and R16 appear on the line 26. Consequently, the chopper constant current control level from the line 17 is made effective in a time period during which the low-level pulse signal is applied from the pulse generating section 20, while being made ineffective in the other time period.

Figure 4:
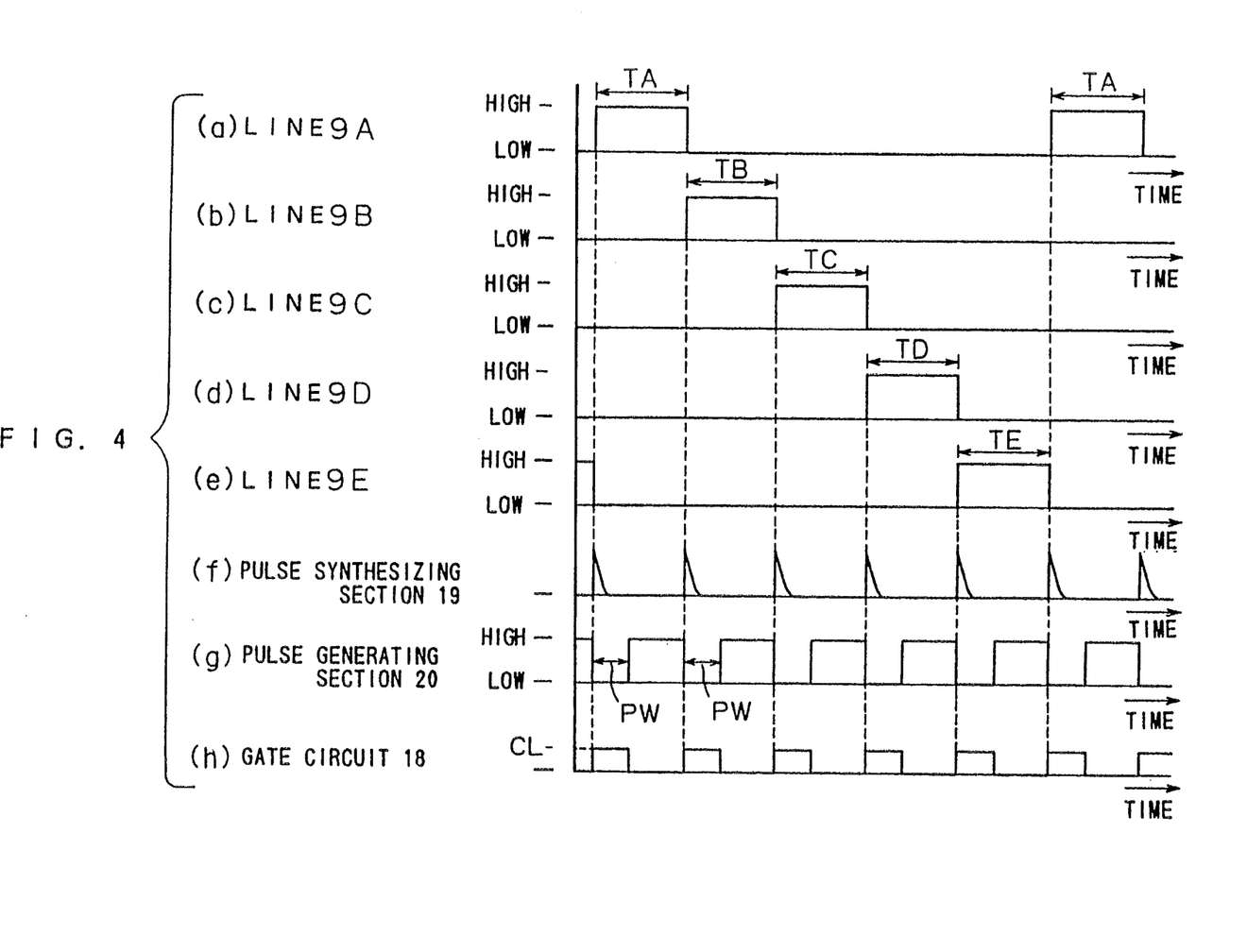
Figure 5:
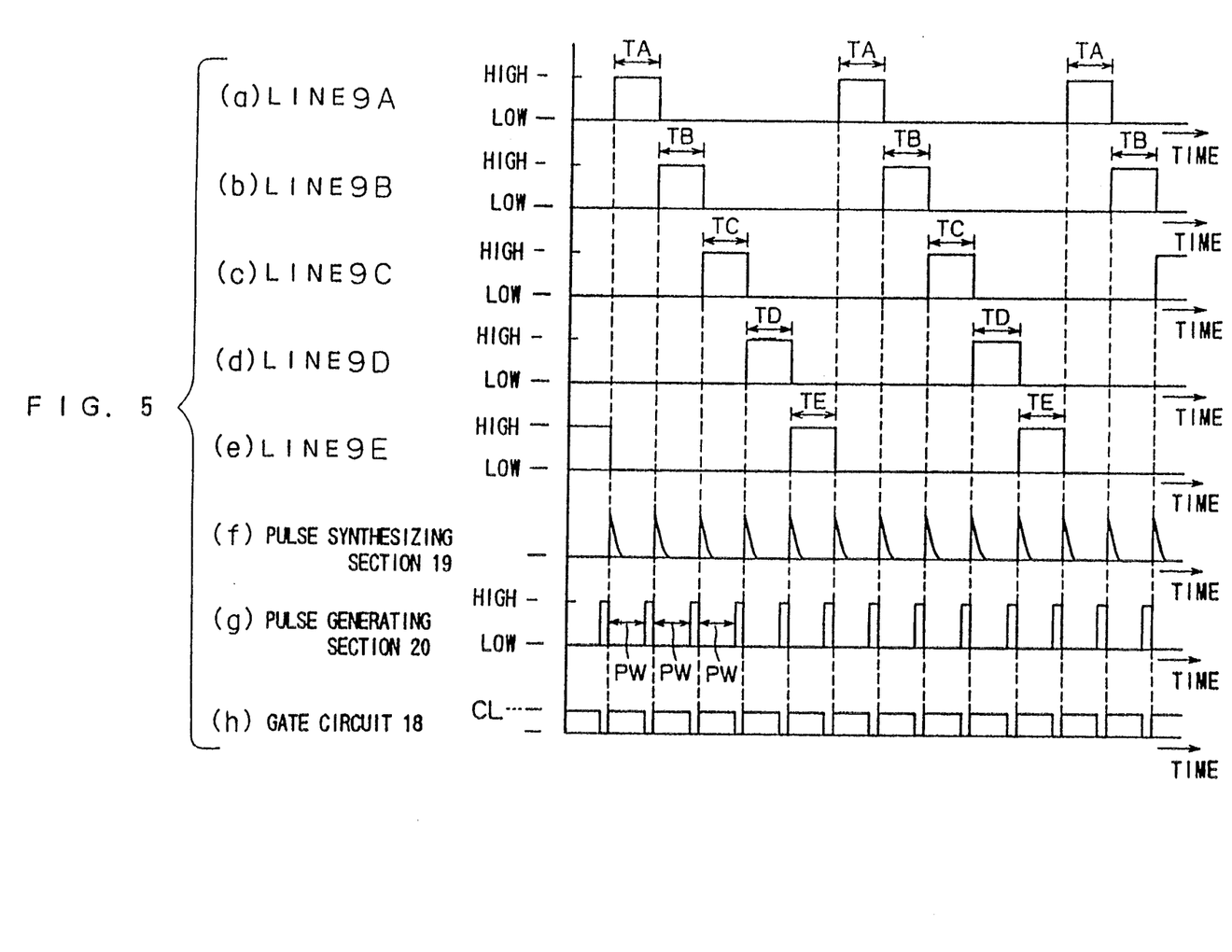

FIGS. 4 and 5 are timing charts for explaining operations, which show as one example operations at the time of enlarged copying. FIG. 4 shows operations in a case where the stepping motor 1 is driven at low speed because the magnification for enlargement is large, and FIG. 5 shows operations in a case where the stepping motor 1 is rotated at high speed because the magnification for enlargement is small. FIGS. 4 (a) and 5 (a) show the control signal outputted to the line 9A, FIGS. 4 (b) and 5 (b) show the control signal outputted to the line 9B, FIGS. 4 (c) and 5 (c) show the control signal outputted to the line 9C, FIGS. 4 (d) and 5 (d) show the control signal outputted to the line 9D, and FIGS. 4 (e) and 5 (e) show the control signal outputted to the line 9E. In addition, FIGS. 4 (f) and 5 (f) show the control signal of the pulse synthesizing section 19, FIGS. 4 (g) and 5 (g) show the output signal of the pulse generating section 20, and FIGS. 4 (h) and 5 (h) show the output signal of the gate circuit 18.

In a time period TA, the high-level signal is outputted to the line 9A, and the low-level signals are respectively outputted to the lines 9B to 9E. Consequently, the transistor 5A is rendered conductive in the form of pulses by the control signal subjected to pulse width modulation which is applied from the chopper constant current control circuit 15. On the other hand, the transistors 5B to 5E are held in the disconnected state. At this time, by the control signals outputted to lines 8A to 8E, the transistors 4C and 4D are rendered conductive, while the remaining transistors 4A, 4B and 4E are disconnected. As a result, the motor windings 2A, 2B, 2C and 2E corresponding to four phases are excited, while the remaining motor winding 2D corresponding to one phase is not excited.

In the subsequent time period TB, the high-level signal is outputted to the line 9B, and the low-level signals are respectively outputted to the remaining lines 9A, 9C, 9D and 9E. Consequently, the transistor 5B is rendered conductive, while the transistors 5A, 5C, 5D and 5E are held in the disconnected state. At this time, by the control signals outputted to the lines 8A to 8E, the transistors 4D and 4E are rendered conductive, while the remaining transistors 4A, 4B and 4C are brought into the disconnected state. As a result, the motor windings 2A, 2B, 2C and 2D corresponding to four phases are excited, while the remaining motor winding 2E corresponding to one phase is not excited.

In the same manner, in the motor driving circuit 3, only the transistors 5C, 4A and 4E are rendered conductive in a time period TC, only the transistors 5D, 4A and 4B are rendered conductive in a time period TD, and only the transistors 5E, 4B and 4C are rendered conductive in a time period TE.

Such operations are circularly repeated, thereby to achieve the driving of the stepping motor 1 by so-called four-phase excitation.

Since the pulse signals outputted to the lines 9A to 9E are further subjected to pulse width control in the chopper constant current control circuit 15, the transistors 5A, 5B, 5C, 5D and 5E are not rendered conductive all the time but in the form of pulses during the time periods TA, TB, TC, TD and TE.

The output signal of the pulse synthesizing section 19 becomes a trigger signal having a differential waveform obtained by detecting rise portions of the pulse-shaped control signals outputted to the lines 9A to 9E, as shown in FIG. 4 (f) and 5 (f). The output signal of the pulse generating section 20 to which the trigger signal is applied becomes a pulse signal which is lowered to a low level in synchronization with the application of the trigger signal and is changed to a high level after a time period of a predetermined pulse width PW.

The output signal of the gate circuit 18 to which the pulse signal is applied is a chopper constant current control level CL applied from the control circuit 10 in a time period during which low-level pulses having the pulse width PW are applied, while being a ground potential in a time period during which no low-level pulses are applied, as shown in FIGS. 4 (h) and 5 (h). Specifically, the chopper constant current control level CL is made effective only in the time period of the pulse width PW after the time when the trigger signal is outputted, while being made ineffective in the remaining time period.

Therefore, the control signals having a relatively large pulse width are respectively applied to the transistors 5A, 5B, 5C, 5D and 5E in a time period during which the gate circuit 18 outputs the chopper constant current control level CL, while the control signals having a small pulse width are respectively applied to the transistors 5A, 5B, 5C, 5D and 5E in a time period during which the gate circuit 18 outputs the ground potential. Specifically, if the gate circuit 18 outputs the ground potential, current supplied to the stepping motor 1 is reduced.

In order to rotate the stepping motor 1 at high speed, a combination of the motor windings corresponding to four phases which are excited out of the motor windings 2A, 2B, 2C, 2D and 2E must be changed at high speed. As apparent from the comparison between FIG. 4 and FIG. 5, therefore, the pulse period of the pulse-shaped control signals outputted to the lines 9A, 9B, 9C, 9D and 9E is shortened. Specifically, the pulse period of the control signals outputted to the lines 9A to 9E is inversely proportional to the rotation speed of the stepping motor 1. Consequently, a time period during which the pulse generating section 20 generates the pulses having a predetermined pulse width PW to make the chopper constant current control level CL effective is inversely proportional to the rotation speed of the stepping motor 1.

On the other hand, a time period during which the chopper constant current control level CL is made effective is the time period of the pulse width P, which is constant and is unrelated to the rotation speed of the stepping motor 1. As a result, the ratio of a time period during which the chopper constant current control level CL is made effective is small at the time of rotation at low speed, while being large at the time of rotation at high speed. Consequently, the current supplied to the stepping motor 1 is increased at the time of rotation at high speed, while being decreased at the time of rotation at low speed irrespective of the fact that the chopper constant current control level CL is made constant.

If the chopper constant current control level CL is set to a value at which current corresponding to torque required at the time of rotation at high speed is supplied to the stepping motor 1, sufficient torque can be produced by the stepping motor 1 at the time of rotation at high speed and overcurrent can be prevented from being supplied to the stepping motor 1 at the time of rotation at low speed. In such a manner, necessary torque can be produced by the stepping motor 1 and overcurrent can be effectively prevented from being applied to the stepping motor 1 when copying is achieved at each magnification, although a constant chopper constant current control level CL is set irrespective of the magnification for enlargement. The same is true for the time of reduced copying.

As described in the foregoing, according to the present embodiment, the control circuit 10, the pulse synthesizing section 19, the pulse generating section 20 and the like constitute pulse generating means for generating pulses having a predetermined pulse width in the period inversely proportional to the rotation speed of the stepping motor 1.

As described in the foregoing, according to the present embodiment, respective predetermined chopper constant current control levels may be only stored in the RAM 21 irrespective of the magnification for enlargement or reduction so as to make enlarged and reduced copying. Consequently, the amount of data to be written in the RAM 21 is small, so that work for making the data to be written in the RAM 21 is not complicated.

Furthermore, even when the chopper constant current control level in the RAM 21 is changed into an abnormal value due to electrical noise, the current supplied to the stepping motor 1 becomes a value corresponding to the rotation speed to some extent. Consequently, overcurrent can be effectively prevented from being supplied to the stepping motor 1 even at the time of rotation at low speed, thereby to make it possible to prevent the transistors in the motor driving circuit 3 and the stepping motor 1 from being destroyed.

Additionally, in, for example, the process of adjustment in the production line, even when the stepping motor 1 is erroneously driven before writing the chopper constant current control level in the RAM 21, it is possible to prevent overcurrent from being applied. Consequently, the motor driving circuit 3 or the like is not destroyed.

Although description was made of the embodiment of the present invention, the present invention is not limited to the above described embodiment. For example, although in the above described embodiment, description was made of a case where the five-phase stepping motor 1 is driven, the present invention is applicable to a stepping motor of any phase. In addition, although in the above described embodiment, description was made of a case where the five-phase stepping motor 1 is subjected to four-phase excitation, another excitation method such as four-phase or five-phase excitation may be employed.

Furthermore, although in the above described embodiment, description was made of a case where the driving control of the stepping motor is carried out, the present invention can be widely applied to not only the stepping motor but also a motor producing torque which varies depending on the value of supplied current is driven.

Additionally, although in the above described embodiment, description was made of the driving control of the stepping motor used for driving the moving frame in the copying machine, the present invention is widely applicable so as to carry out the driving control of a motor used for arbitrary applications.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor control device for controlling a motor which produces torque, which torque is varied depending on a value of current supplied to said motor, said motor control device comprising:
   a power supply for generating current to be supplied to said motor;
   pulse generating means for generating pulses having a predetermined pulse width in a period approximately inversely proportional to rotation speed of said motor;
   control signal generating means for generating a current control signal corresponding to the current to be supplied to said motor so as to obtain necessary torque;
   gate means receiving the current control signal from said control signal generating means, a predetermined reference signal corresponding to current less than the current corresponding to said current control signal, and the pulses generated by said pulse generating means for outputting said current control signal in a time period during which the pulses are applied, while outputting said predetermined reference signal in a time period during which said pulses are not applied; and current control means receiving an output signal of said gate means for controlling supply of the current to said motor from said power supply so that the current to be supplied to said motor becomes a value corresponding to the signal applied from said gate means.

2. A motor control device according to claim 1, wherein said motor is a stepping motor.

3. A motor control device according to claim 1, wherein said motor has a plurality of motor windings, said motor control device further comprises control means for generating a plurality of pulse signals which rise circularly so as to circularly excite said plurality of motor windings, and said current control means has chopper constant current control means for controlling the supply of the current to said motor using, as control signals, signals respectively obtained by subjecting the pulse signals generated by said control means to pulse width modulation on the basis of the output signal of said gate means.

4. A motor control device according to claim 1, wherein said motor has a plurality of motor windings, and said pulse generating means comprises control means for generating a plurality of pulse signals which rise circularly so as to circularly excite said plurality of motor windings, pulse synthesizing means for detecting rise portions of the plurality of pulse signals generated by the control means to generate a predetermined trigger signal, and means for generating a signal having a predetermined pulse width in response to the trigger signal generated from the pulse synthesizing means.

5. A motor control device according to claim 1, further comprising storing means for storing a value corresponding to said current control signal, said control signal generating means generating said current control signal on the basis of the value stored in said storing means.

6. A motor control device according to claim 5, wherein said motor is used for driving a scanning system provided in a copying machine for scanning a document, is driven to rotate at predetermined rotation speed at time of copying at equal magnification, is driven to rotate at time of enlarged copying at lower speed than that at the time of copying at equal magnification, and is driven to rotate at time of reduced copying at higher speed than that at the time of copying at equal magnification, and said storing means stores respective constant values corresponding to the time of copying at equal magnification, the time of enlarged copying, and the time of reduced copying.

* * * * *